Nov. 15, 1960 R. F. NIXON 2,959,991
ADJUSTABLE TOOL UNIT
Filed Oct. 16, 1958
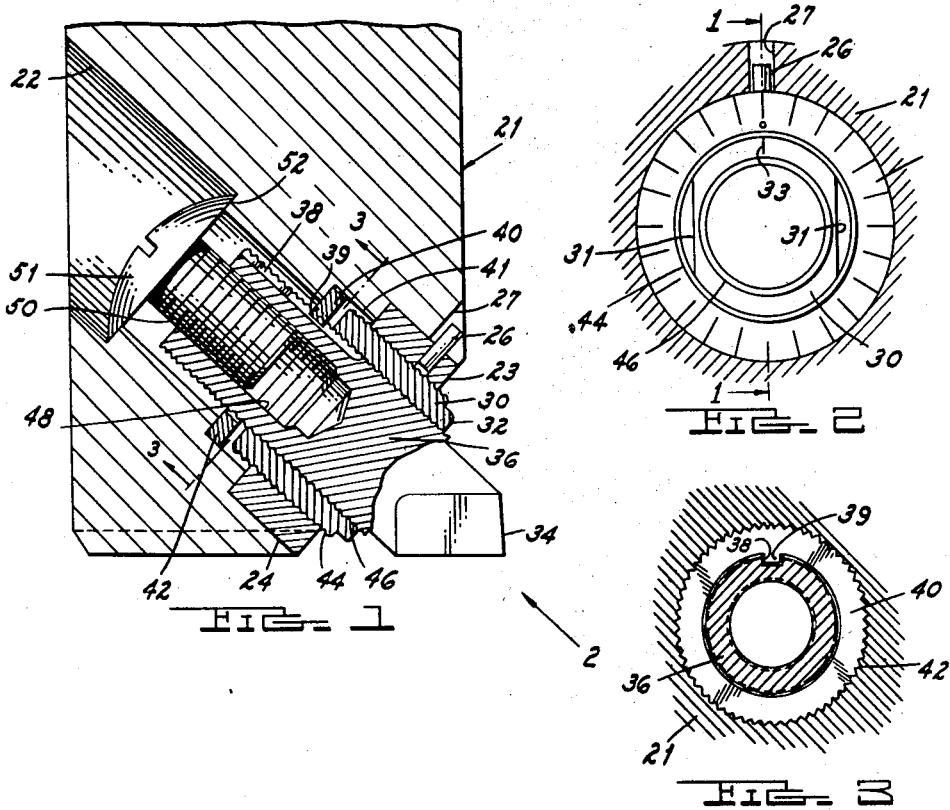
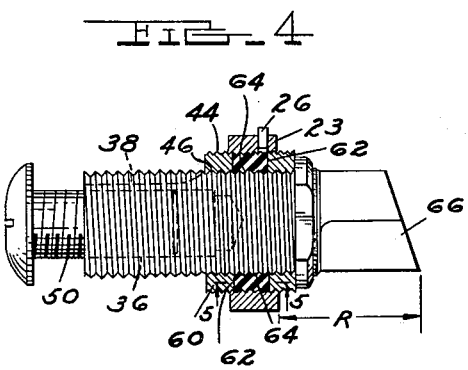
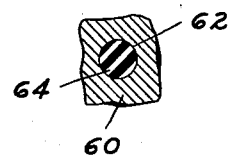
INVENTOR.
RAYMOND F. NIXON
BY
ATTORNEYS United States Patent Office 2,959,991
Patented Nov. 15, 1960

2,959,991

ADJUSTABLE TOOL UNIT

Raymond F. Nixon, Gaylord, Mich., assignor to Beaver Tool & Engineering Corporation, Gaylord, Mich., a corporation of Michigan Filed Oct. 16, 1958, Ser. No. 767,697

10 Claims. (Cl. 77—58)

This invention relates to an improved construction for an adjustable tool unit for use in conjunction with a tool holder. The invention and the embodiment thereof to be described has particular utility in connection with boring bars where it is conventional practice to equip the boring bar with one or more tool unit mounting sockets extending through the bar in any desired relation to the axis thereof. Tool units of this type generally include a tool carrying member, some means for retaining the tool carrying member in the tool mounting socket and some means for adjusting the position of the tool carrying member axially of the tool mounting socket.

This application is a continuation-in-part of my prior copending application Serial No. 639,913 filed February 13, 1957, now abandoned.

The construction provided by the present invention results in a tool unit which can be manufactured in the range of sizes commercially desired, which results in a simple formation for the tool mounting socket, which provides extremely fine increments of tool adjustment, which positively locates the tool unit in the tool mounting socket and which provides a self-acting means for holding a pre-set adjustment of the unit until it is mounted in its socket.

Essentially the preferred construction of the invention includes a mounting ring insertable in one end of the tool socket of a tool holder and means for fixing the ring against rotary movement in the socket. The mounting ring is internally threaded and an adjusting sleeve having both external and internal threads is carried by the mounting ring. A cutting tool is secured to one end of a tool carrying member which has external threads engaging the internal threads of the adjusting sleeve. The external and internal threads of the adjusting sleeve are of different pitch. Means are provided for preventing rotation of the tool carrying member in the socket but allowing axial movement thereof so that rotation of the adjusting sleeve results in axially moving the tool carrying member in accordance with any difference in the pitch of the threaded portions of the sleeve. Means are also provided for restraining the sleeve against rotation so as to lock the tool carrying member in adjusted position.

In order that the unit may be pre-adjusted or set out of its socket, means are provided for holding the mounting ring, adjusting sleeve and tool carrier in any desired relative position.

A simplified socket construction results from the use of key and keyway elements for preventing rotation of the tool carrier and by forming one of these elements on the inner circumference of an annular member, the outer circumference of which includes a series of projections for non-rotatable engagement with the mounting socket.

The construction permits the achievement of a very fine increment of axial adjustment of the tool carrier. This adjustment is directly readable on a calibrated dial formed on the outer surface of the mounting ring from an index mark provided on the adjusting sleeve.

Other features and advantages of the construction will be apparent from the following description of a presently preferred embodiment of the invention disclosed in the accompanying drawings which comprise the following views:

Fig. 1, a sectional elevation taken through the tool mounting socket of a boring bar and showing the tool unit mounted therein. The relation of this section to the construction of the tool unit is indicated by the line 1—1 of Fig. 2;

Fig. 2, a plan view of the cutting tool and of the tool unit taken as indicated by the arrow 2 on Fig. 1;

Fig. 3, a sectional detail taken along the line 3—3 of Fig. 1;

Fig. 4, an elevation, partly in section, showing a modified construction; and

Fig. 5, a sectional detail taken on the line 5—5 of Fig. 4.

In Fig. 1 a tool holder or boring bar is indicated generally by the reference 21 and is provided with a tool mounting socket 22 extending through the bar at an angle to its longitudinal axis and dimensioned to receive the parts of the tool unit construction as will be pointed out below.

The tool unit construction includes a member 23, which will be termed a mounting ring, inserted in a counterbored portion or seat 24 provided at the cutting tool end of the tool mounting socket. Preferably a snug but not an interference fit is used between the mounting ring 23 and its seat so that the mounting ring is freely insertable therein and removable therefrom, and a pin 26 carried by the mounting ring seats in a slot 27 of the boring bar to form a key means for positively restraining the mounting ring against rotation in the socket and for defining the assembled relation of the mounting ring with the tool holder.

Mounting ring 23 is internally threaded to receive an externally threaded adjusting sleeve 30 which has wrench flats 31 (Fig. 2) on its outer end 32. The outer surface of the mounting ring 23 is suitably graduated as shown in Fig. 2 and the adjusted sleeve 30 is provided with an index mark 33.

A cutting tool 34 is suitably secured to a tool carrying member 36 which is externally threaded for engagement with internal threads provided on the adjusting sleeve 30. A keyway 38 is formed on the tool carrying member 36 and is engaged by a key 39 which projects from the inner circumference of an annular rotation restraining member 40. Member 40 is received in a second counterbored portion 41 of the tool mounting socket which it engages through a series of small projections or serrations 42 formed on the outer circumference of the member 40.

The external and internal threads 44 and 46 respectively of the adjusting sleeve 30 each have a different pitch. For example, the threads 44 may be relatively coarse and right hand, while the threads 46 may be somewhat finer and the same hand. In this case rotation of the adjusting sleeve 30 will result in axial movement of the tool carrying member 36 an amount dependent upon the difference between the pitch of threads 44 and 46. In consequence a very fine increment of axial adjustment can be obtained with relatively coarse, inexpensively formed threads.

Tool carrying member 36 is further provided with a threaded hole 48 in which a screw 50 is inserted after the unit has been mounted in the tool socket, the head 51 of the screw engaging the annular shoulder 52 thereof. When tightened, screw 50 acts to restrain the adjusting sleeve 30 against rotation to thereby lock the tool carrying member 36 in adjusted position.

Setting of a tool unit to approximately the cutting dimension desired is frequently done with the unit removed from its socket. Two adjusting movements are then available for setting the tool—movement of the adjusting sleeve 30 in the threads of the mounting ring 23 and movement of the tool carrying member 36 in the threads of the adjusting sleeve 30.

The modified construction of Figs. 4 and 5 incorporates means for maintaining the parts of the tool unit in any setting until the tool unit is inserted in its socket and locked in adjusted position by the screw 50.

All parts of the construction of Figs. 4 and 5 are similar to those previously described and are identified by the same reference numbers with the exception of the adjusting sleeve 60 which is drilled to provide two diametrically aligned holes 62. A cylindrical insert 64 of resilient material, such as silicone rubber, is mounted in each hole 62 and each insert 64 frictionally engages the internal threads of the mounting ring 23 and the external threads of the tool carrying member 36. The amount of friction induced by the inserts 64 is not enough to prevent adjusting movement of the parts, but is sufficient to prevent the setting of the parts being disturbed in ordinary handling.

Any desired cutting dimension "R" (Fig. 4) is obtained in the following manner with the tool unit removed from its socket:

(1) Tool carrying member 36 is turned into the adjusting sleeve 60 until the end of the threads of the tool carrier is reached and the cutting tool 66 is adjacent the outer face of the adjusting sleeve as shown.

(2) Mounting ring 23 is then turned on the adjusting sleeve 60 until the "R" dimension is obtained. If the mounting ring 23 reaches the back position on the threads of the adjusting sleeve 60 before the "R" dimension is obtained, then the tool carrying member is turned until the "R" dimension is reached.

This "R" dimension setting will be retained until the unit is inserted in its socket, when any required final adjustment will be made by turning the adjusting sleeve 60 before the unit is finally locked in place.

When the tool unit is installed in its socket and the locking screw 50 is tightened, all threaded parts of the tool unit are united and in effect a unitary structure is formed in which the tool carrying member 36 is reinforced by the adjusting sleeve, whose length exceeds that of the mounting ring 23. This is particularly important in extended positions of the tool carrying member, for any portion of the adjusting sleeve 30 which projects from the outer surface of the mounting ring 23 will give added support to the similarly projecting portion of the tool carrying member. Improved resistance to tool chatter results from this construction.

It can be seen that the formation of the tool mounting socket 22 is simple. The projections 42 of key member 40 enable this member to be easily mounted in the tool carrying socket in non-rotatable relation therewith.

The external configuration of the mounting ring 23 is cylindrical and the counterbored portion 24 of the socket provides a cylindrical recess or seat for the tool unit. A close fit is provided between the mounting ring and this seat and as a result the tool unit is very rigidly mounted in the boring bar 21. Furthermore, the unit can be mounted in the boring bar in only one position as defined by the pin 26 and slot 27. This mounting insures very high repetitive accuracy in assembling the tool unit with the boring bar. When assembled with the tool holder a positive relation exists between the holder and unit which is not distrubed when any adjustment is made to the position of the tool carrying member. In other words, a loosening of the locking screw 50 to permit rotation of the adjusting sleeve 30 does not affect the assembled relationship between the mounting ring, tool carrying member and the tool holder.

The construction incorporates the fine adjustment attainable from the use of differential threads in a tool unit of a size comparable with other units of this general type.

While preferred embodiments have been described above in detail, it will be understood that numerous modifications might be resorted to without departing from the scope of my invention as defined in the following claims.

I claim:

1. A tool unit of the type described comprising a mounting ring having internal threads, a tool carrying member having external threads, an adjusting sleeve interposed between said mounting ring and tool carrying member, said adjusting sleeve having external and internal threads of different pitch respectively engaging the said threads of said ring and member, a keyway formed along at least a portion of said tool carrying member, means for preventing rotation of said tool carrying member including an annular member having a key projecting from the inner circumference thereof into engagement with said keyway and means projecting from the outer circumference thereof for non-rotatable engagement with a tool holder.

2. A tool unit for a tool holder provided with a tool unit mounting socket formed therethrough comprising a mounting ring insertable in one end of said socket, means for preventing rotation of said mounting ring in said socket, said mounting ring having internal threads, a tool carrying member having external threads, an adjusting sleeve interposed between said mounting ring and tool carrying member, said adjusting sleeve having external and internal threads of different pitch respectively engaging the said threads of said ring and member, a keyway formed along at least a portion of said tool carrying member, means for preventing rotation of said tool carrying member including an annular member having a key projecting from the inner circumference thereof into engagement with said keyway and means projecting from the outer circumference thereof for non-rotatable engagement with said mounting socket.

3. A tool unit for a tool holder provided with a tool unit mounting socket formed therethrough, said mounting socket having a counterbored cylindrical seat at one end thereof, said tool unit comprising an annular externally cylindrical mounting ring freely insertable in and removable from said seat, key means between said seat and mounting ring to prevent rotation of said mounting ring in said seat and to define the assembled relation of said mounting ring with said tool holder, a graduated dial formed on the outer end of said mounting ring, a thread formed internally on said mounting ring, a cylindrical tool carrying member having an external thread thereon, a differential adjusting sleeve having internal and external threads of different pitch respectively engaging said tool carrying member and said mounting ring, a keyway on said tool carrier engageable with key means on said mounting socket and releasable means for selectively restraining said sleeve against rotation relative to said socket.

4. A tool unit as set forth in claim 3 wherein said key means on said mounting socket comprises an annular member inserted in said socket in fixed relation therewith, said annular member having a key projecting inwardly thereof for engagement with said keyway on said tool carrier.

5. A tool unit for a tool holder provided with a tool unit mounting socket formed therethrough, said mounting socket having a counterbored cylindrical seat at one end thereof, said tool unit comprising an annular externally cylindrical mounting ring slidably insertable in and removable from said seat, key means between said seat and mounting ring to prevent rotation of said mounting ring in said seat and to define the assembled relation of said mounting ring with said tool holder, a thread formed internally on said mounting ring, a cylindrical tool carrying member having an external thread thereon, a differential adjusting sleeve having internal and external threads of different pitch respectively engaging said tool carrying member and said mounting ring, interengageable key and keyway means on said tool carrying member and socket for preventing relative rotation therebetween, and releasable means for selectively restraining said sleeve against rotation relative to said socket.

6. A tool unit according to claim 5 wherein said key and keyway means on said tool carrying member and socket includes an annular member having means projecting from the outer circumference thereof for non-rotatable engagement with said socket and a key element formed on the inner circumference of said annular member for engagement by a complementary key element on said tool carrying member.

7. A tool unit according to claim 6 further characterized by said socket including a shoulder for axially defining the assembled position of said annular member in said socket.

8. A tool unit for a tool holder provided with a tool unit mounting socket formed therein comprising a mounting ring slidably insertable in and removable from said socket, key means between said socket and mounting ring to prevent rotation of said mounting ring in said socket, said mounting ring having an internal thread, a tool carrying member having an external thread thereon, an adjusting sleeve having internal and external threads of different pitch respectively engaging the said threads of said tool carrying member and said mounting ring, interengageable key and keyway means on said tool carrying member and socket for defining slidable and non-rotatable relative movement therebetween, and releasable means for selectively restraining said sleeve against rotation relative to said socket.

9. A tool unit for a tool holder provided with a tool unit mounting socket formed therethrough, said mounting socket having a counterbored cylindrical seat at one end thereof, said tool unit comprising an annular externally cylindrical mounting ring dimensioned for sliding engagement in the said seat of said socket for free insertion and removal of said tool unit therefrom, key means between said seat and mounting ring to prevent rotation of said mounting ring in said seat and to define the assembled relation of said mounting ring with said tool holder, a graduated dial formed on the outer end of said mounting ring, a thread formed internally on said mounting ring, a cylindrical tool carrying member having an external thread thereon, a differential adjusting sleeve having internal and external threads of different pitch respectively engaging said tool carrying member and said mounting ring, interengageable key and keyway means on said tool carrier and socket whereby said tool carrier may be rotated relative to said sleeve and mounting ring when said tool unit is removed from said socket, said tool carrier being held against rotation relative to said tool holder when said tool unit is installed in said socket, and releasable means for selectively restraining said sleeve against rotation relative to said socket.

10. A tool unit construction according to claim 9 further characterized by said adjusting sleeve being provided with at least one insert of resilient material for frictional engagement with the said threads of said mounting ring and tool carrying member.

References Cited in the file of this patent

UNITED STATES PATENTS

| | | |
|---|---|---|
| 2,114,384 | Jearum | Apr. 19, 1938 |
| 2,537,517 | De Vlieg | Jan. 9, 1951 |
| 2,725,915 | Johnson | Dec. 6, 1955 |

FOREIGN PATENTS

| | | |
|---|---|---|
| 609,497 | France | May 15, 1926 |

OTHER REFERENCES

"Microbore," by De Vliez, catalogue #55, copyright 1956, pp. 1 and 4.